United States Patent
Byun

(10) Patent No.: US 11,609,710 B2
(45) Date of Patent: Mar. 21, 2023

(54) HOST, DATA STORAGE DEVICE, DATA PROCESSING SYSTEM AND DATA PROCESSING METHOD

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

(21) Appl. No.: 17/177,722

(22) Filed: Feb. 17, 2021

(65) Prior Publication Data

US 2022/0107757 A1  Apr. 7, 2022

(30) Foreign Application Priority Data

Oct. 5, 2020 (KR) .......................... 10-2020-0127937

(51) Int. Cl.
 *G06F 3/06* (2006.01)
 *G06F 12/10* (2016.01)

(52) U.S. Cl.
 CPC .......... *G06F 3/0659* (2013.01); *G06F 3/0604* (2013.01); *G06F 3/0679* (2013.01); *G06F 12/10* (2013.01); *G06F 2212/657* (2013.01)

(58) Field of Classification Search
 CPC .... G06F 3/0659; G06F 3/0604; G06F 3/0679; G06F 12/10; G06F 2212/657; G06F 3/061; G06F 3/0656; G06F 3/0658; G06F 3/0631; G06F 9/3802
 See application file for complete search history.

(56) References Cited

U.S. PATENT DOCUMENTS

| | | | |
|---|---|---|---|
| 2018/0173461 A1* | 6/2018 | Carroll | G06F 3/0656 |
| 2019/0205254 A1* | 7/2019 | Yochai | G06F 12/0888 |
| 2019/0220218 A1* | 7/2019 | Deshe | G06F 3/0679 |
| 2019/0250916 A1* | 8/2019 | Lu | G06F 9/30185 |
| 2020/0065107 A1* | 2/2020 | Underwood | G06F 9/3814 |

FOREIGN PATENT DOCUMENTS

KR  10-2019-0064083  6/2019

* cited by examiner

*Primary Examiner* — Sean D Rossiter
(74) *Attorney, Agent, or Firm* — IP & T Group LLP

(57) ABSTRACT

A data processing system may include: a host including a command queue including a plurality of command storage areas, and configured to store summary information of a second command among a plurality of commands in a reserved storage area of a command storage area, among the plurality of command storage areas, in which a first command among the plurality of commands being a previous command to the second command is stored, when inserting the second command into the command queue; and a data storage device configured to fetch the first command from the command queue and store the fetched first command, according to a new command notification received from the host.

20 Claims, 14 Drawing Sheets

HOST, DATA STORAGE DEVICE, DATA PROCESSING SYSTEM AND DATA PROCESSING METHOD

CROSS-REFERENCES TO RELATED APPLICATION

The present application claims priority under 35 U.S.C. § 119(a) to Korean application number 10-2020-0127937, filed on Oct. 5, 2020, which is incorporated herein by reference in its entirety.

BACKGROUND

1. Technical Field

Various embodiments generally relate to a semiconductor device, and more particularly, to a host, a data storage device, a data processing system and a data processing method.

2. Related Art

Since a data storage device using a memory device has no mechanical driver, the data storage device has excellent stability and durability, high information access speed, and low power consumption. The data storage device having such advantages includes a Universal Serial Bus (USB) memory device, a memory card having various interfaces, a Universal Flash Storage (UFS) device, and a Solid State Drive (SSD).

The specification standardization technologies for flash storage, such as UFS and Non-Volatile Memory express (NVMe) protocols, seek to improve performance by defining new interfaces beyond the existing interface limit.

Operators have recognized that there is a limitation in improving the performance of the UFS only by improving the hardware specification of a host or the software of a data storage device, and have sought a method for improving the operation efficiency between the host and the data storage device.

SUMMARY

Various embodiments are directed to a host, a data storage device, a data processing system and a data processing method, which improves command processing performance in a data storage device by changing a command insertion method such that the data storage device can recognize a next command in advance.

In an embodiment, a data processing system may include: a host including a command queue including a plurality of command storage areas, and configured to store summary information of a second command among a plurality of commands in a reserved storage area of a command storage area, among the plurality of command storage areas, in which a first command among the plurality of commands being a previous command to the second command is stored, when inserting the second command into the command queue; and a data storage device configured to fetch the first command from the command queue and store the fetched first command, according to a new command notification received from the host.

In an embodiment, a host may include: a host memory including a command queue including a plurality of command storage areas, and configured to sequentially store plural pieces of command information, inserted thereto, in the plurality of command storage areas, respectively; and a processor configured to store summary information of a second command of a plurality of commands in the command storage area of a first command of a plurality of commands, when inserting the second command into the command queue. Each of the command storage areas may include a reserved storage area for storing summary information of a next command, and the summary information of the second command is stored in the reserved storage area.

In an embodiment, a data storage device may include: a nonvolatile memory device; and a controller configured to control the nonvolatile memory device to fetch a first command associated with the nonvolatile memory device from a command queue of a host and store the fetched first command, according to a new command notification received from the host, and perform a pre-operation related to a second command associated with the nonvolatile memory device based on summary information of the second command, included in the first command. The second command may be a next command of the first command.

In an embodiment, a data processing method may include: allocating a reserved storage area in each of a plurality of command storage areas in a command queue; inserting a first command into a first command storage area of the command queue; storing summary information of a second command in the reserved storage area of the first command which is a previous command of the second command, and generating a new command notification, when inserting the second command into a second command storage area of the command queue; fetching the first command; and performing a pre-operation related to the second command based on the summary information of the second command, transferred with the first command.

The storing of the summary information of the second command may include: checking whether the first command has been fetched, when inserting the second command; and storing the summary information of the second command in the reserved storage area of the command storage area in which the first command is stored, when the check result indicates that the first command is not yet fetched.

The storing of the summary information of the second command may include storing the summary information of the second command in the reserved storage area of the command storage area in which the first command is stored, without checking whether the first command has been fetched, when inserting the second command into the command queue.

In an embodiment, a data processing system may include: a host including a command queue including a plurality of command storage areas, and configured to sequentially store a first command and a second command after the first command in first and second command storage areas of the command queue, each command storage area including a reserved storage area, and store summary information of the second command in the reserved storage area of the first command storage area; and a data storage device including a memory device, and configured to receive, from the host, notification for each command, fetch the first command and the summary information of the second command from the first command storage area in response to the notification for the first command from the host, and perform an operation on the memory device associated with the first command and a pre-operation on the memory device associated with the second command.

In accordance with the present embodiments, when storing a command in the command queue, the host may store summary information of a next command together, and transfer the summary information to the data storage device in advance. Therefore, before the next command is fetched, the data storage device may perform a pre-operation required for processing the next command, based on the summary information of the next command, thereby improving the command processing performance.

DETAILED DESCRIPTION

Hereinafter, a host, a data storage device, a data processing system and a data processing method according to the present disclosure will be described below with reference to the accompanying drawings through various embodiments.

Figure 1:
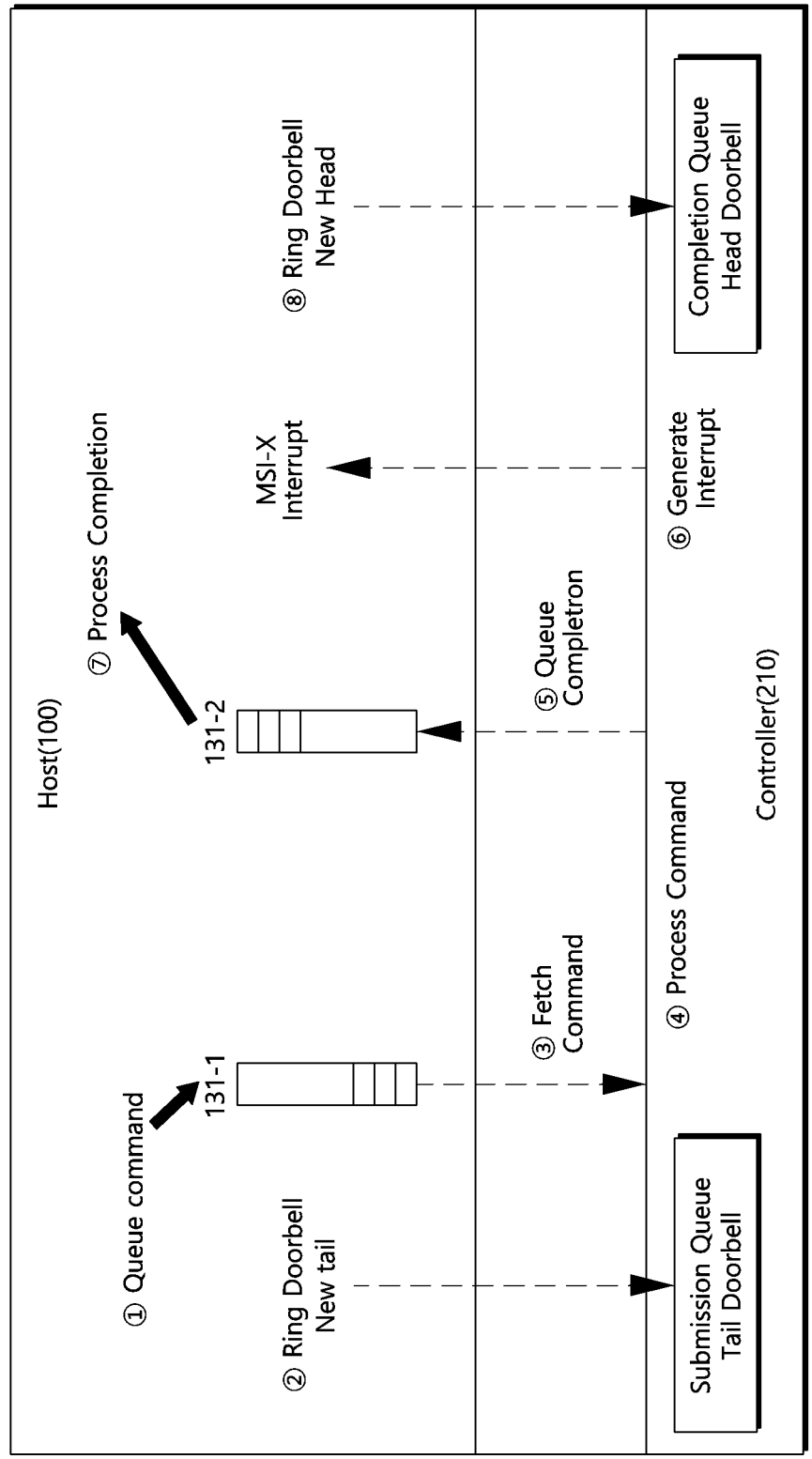
FIG. 1 is a diagram illustrating a configuration of a data processing system in accordance with an embodiment of the present disclosure.

FIG. 1 is a diagram illustrating a configuration of a data processing system 10 in accordance with an embodiment of the present disclosure.

Referring to FIG. 1, the data processing system 10 may include a host 100 and a data storage device-side controller 210. The controller 210 may be a Non-Volatile Memory express (NVMe) controller.

In FIG. 1, a process of transferring an input and output (I/O) command to the controller 210 through a command queue installed in the host 100 and executing the I/O command through the command queue may be performed as follows.

First, the host 100 may insert a command into a submission queue 131-1 (①Queue Command), and inform the controller 210 that a new command is present (②Ring Doorbell New Tail).

In the present embodiment, when inserting a current command, the host 100 may additionally store summary information of the current command in a storage area where a previous command of the command queue is stored, and thus enable the controller 210 to perform a pre-operation related to a command to be fetched next. This process will be described below in detail.

The controller 210 may recognize the presence of the new command, fetch the command from the submission queue 131-1 of the host 100 (③ Fetch Command), and then process the corresponding command (④ Process Command).

When completely processing the command, the controller 210 may insert the processing result into a completion queue 131-2 (⑤ Queue Completion), and generate an MSI_X interrupt (⑥ Generate Interrupt).

The host 100 may check the command processing result through the completion queue 131-2 (⑦ Process Completion), and transmit, to the controller 210, a notification indicating that the host 100 has completely checked the interrupt (⑧ Ring Doorbell New Head).

Figure 2:
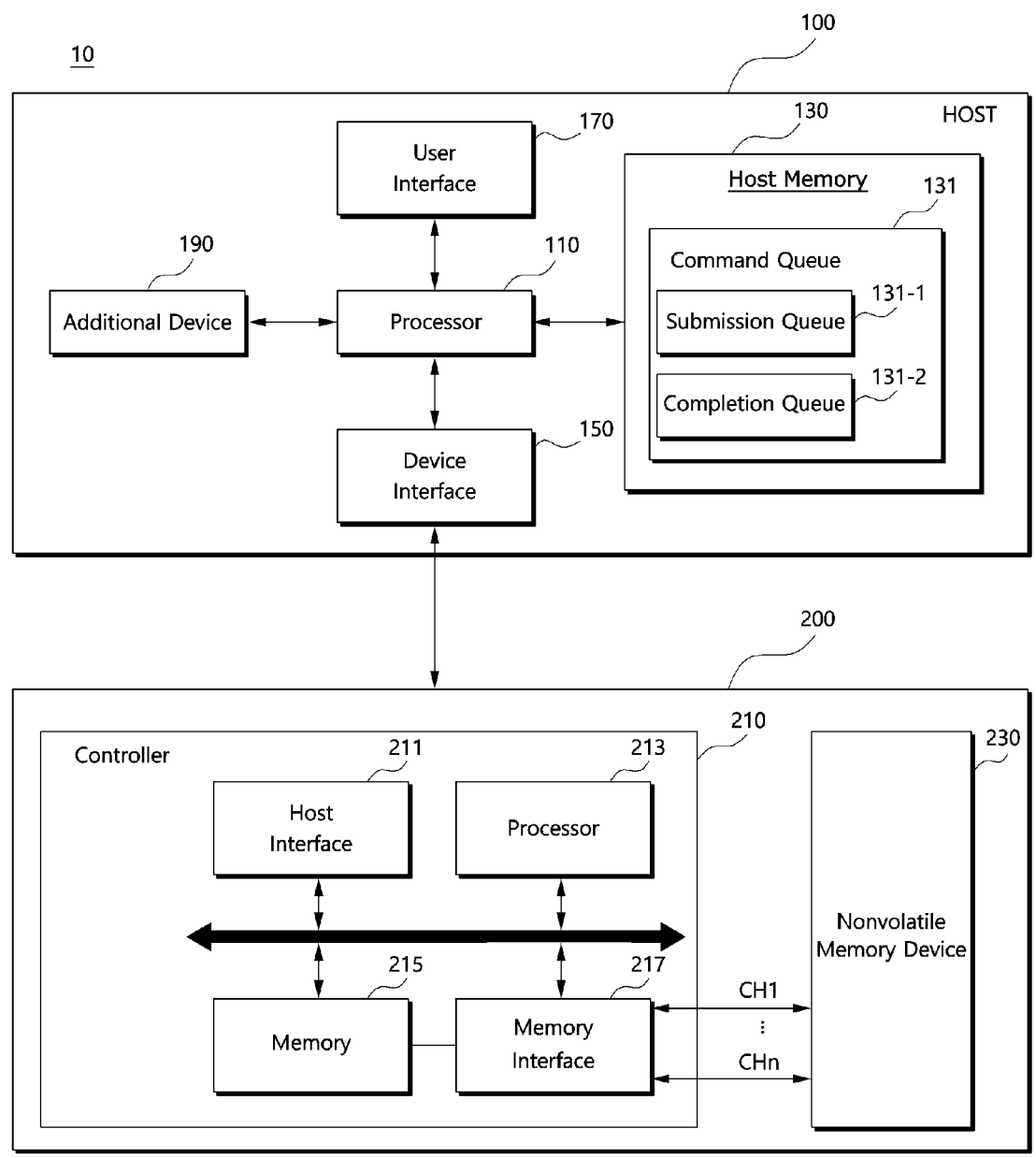
FIG. 2 is a diagram illustrating a data processing system in accordance with an embodiment of the present disclosure.

FIG. 2 is a control block diagram illustrating a data processing system 10 in accordance with an embodiment of the present disclosure.

Hereafter, the data processing system will be described with reference to FIGS. 3 to 7 which are diagrams for describing a method for storing a command in a command queue in accordance with an embodiment of the present disclosure.

Referring to FIG. 2, the data processing system 10 may include a host 100 and a data storage device 200.

When inserting a second command into a command queue 131 including a plurality of command storage areas each having a reserved storage area allocated thereto, the host 100 may store summary information of the second command in the reserved storage area of the command storage area in which a first command corresponding to the previous command of the second command is stored. The second command may indicate a command which is generated after the first command. The first command may indicate a single command or a plurality of commands which are generated before the second command is generated.

In some embodiments, the first command may include command description information for command processing. The summary information of the second command may indicate brief information for enabling the controller to perform a pre-operation on the second command. The summary information may include a smaller amount of information than the command description information.

For example, the summary information may include a command type, a start logical block address (LBA) and a size of a command. However, the present embodiment is not limited thereto, and the information included in the summary information may be changed according to an operator's necessity.

When the summary information is stored in the reserved storage area of the above-described command storage area in which the first command is stored, it may indicate that the summary information is stored in the command storage area of the first command so as to be fetched together when the first command is fetched to the data storage device 200.

Specifically, the host 100 may include a processor 110, a host memory 130, a device interface 150, a user interface 170 and an additional device 190.

The processor 110 may control overall operations of the data processing system 10, and perform a logical operation. The processor 110 may be a hardware-based data processing device including circuits which are physically configured to execute commands included in a code or program.

When inserting the second command into the command queue 131, the processor 110 may store the summary information of the second command in the reserved storage area allocated to the inside of the command storage area of the first command.

Figure 3:
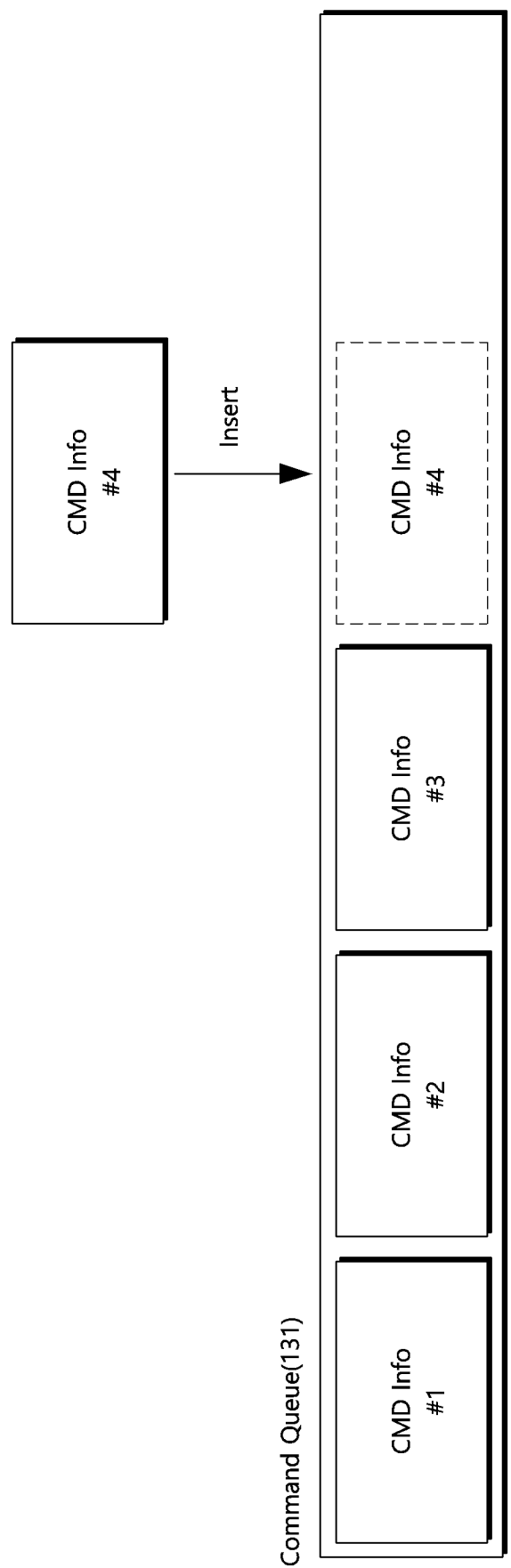
FIGS. 3 to 7 are diagrams for describing a method for storing a command in a command queue in accordance with an embodiment of the present disclosure.

As illustrated in FIG. 3, the processor 110 may sequentially insert commands CMD Info into the command queue 131.

Figure 4:
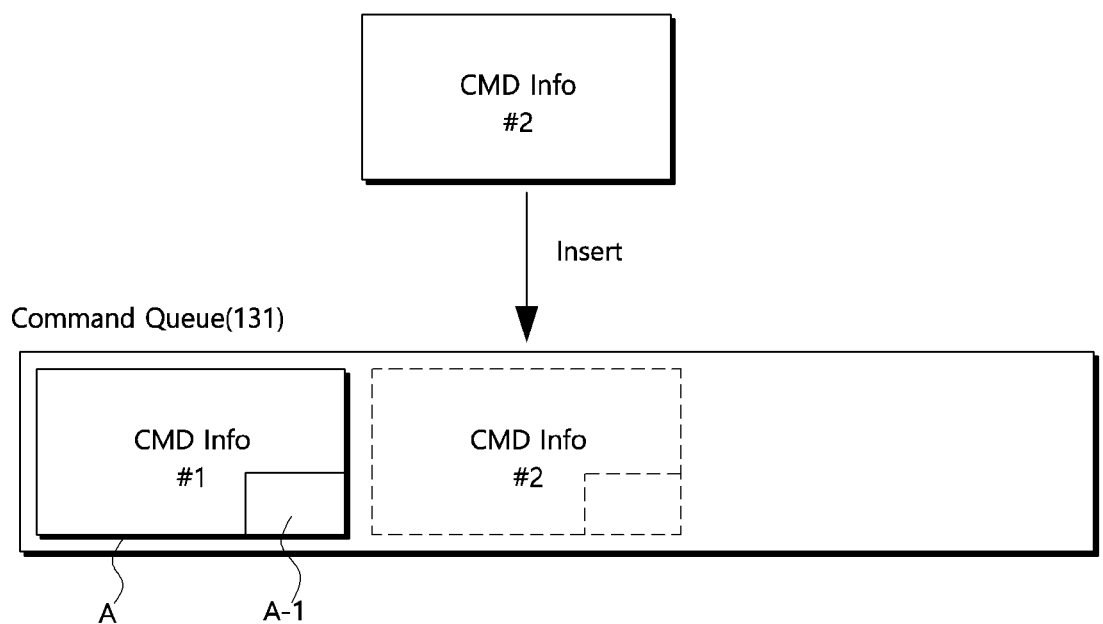

In the present embodiment as illustrated in FIG. 4, when inserting a second command CMD Info #2 into the command queue 131, the processor 110 may store summary information of the second command in a reserved storage area A-1 allocated to the inside of a command storage area A in which a first command CMD Info #1 is stored. The reserved storage area may indicate an area which is previously allocated to store summary information of the next command.

When inserting the second command into the command queue 131, the processor 110 may check whether the first command has been fetched. When it is checked that the first command is not yet fetched, the processor 110 may store the summary information of the second command in the reserved storage area of the command storage area in which the first command is stored.

Figure 7:
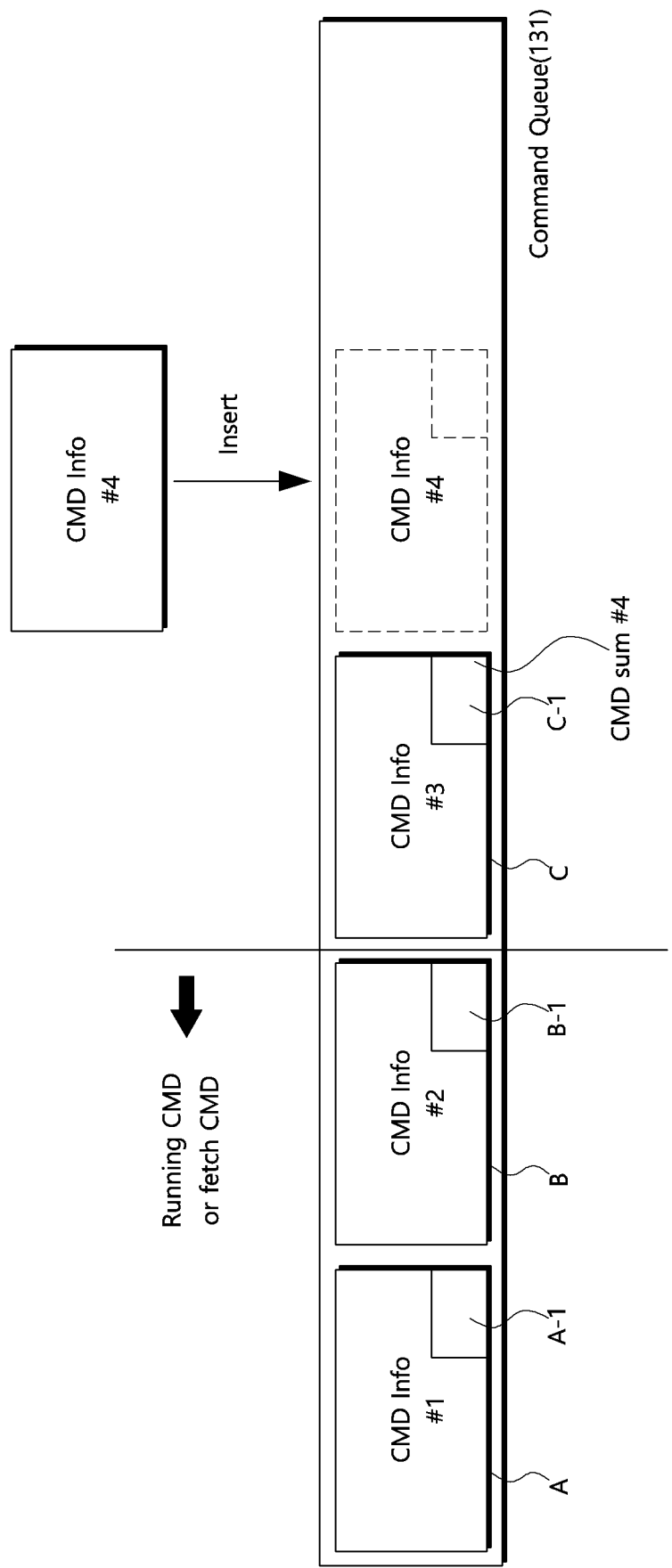

In the illustrated example of FIG. 7, the processor 110 may check whether CMD Info #3 has been fetched, when inserting CMD Info #4. When it is checked that CMD Info 3# is not yet fetched, the processor 110 may store CMD sum #4 in C-1. The CMD sum #4 may be summary information of the CMD info #4.

When inserting the second command into the command queue 131, the processor 110 may store the summary information of the second command in the reserved storage area of the command storage area in which the first command is stored, without checking whether the first command has been fetched.

As described above, when including summary information of a current command, which is to be inserted, in a previous command, the processor 110 may check whether the previous command has been fetched to the data storage device 200, and then perform the including process. Alternatively, the processor 110 may perform the including process regardless of whether the previous command has been fetched to the data storage device 200.

When allocating a reserved storage area to a command storage area, the processor 110 may allocate a reserved storage area which has a size capable of storing summary information of one or more second commands.

In the present embodiment, the first command may indicate a command which is generated before the second command is generated, and indicate a single command or a plurality of commands.

When configured to store summary information of one command just before the second command in the case that the summary information of the second command is stored, the processor 110 may store the summary information of the second command in the reserved storage area of one first command just before the second command.

In the illustrated example of FIG. 4, the processor 110 may store the summary information of the second command only in the reserved storage area A-1 allocated to the inside of the command storage area A in which the first command CMD Info #1 is stored.

Figure 5:
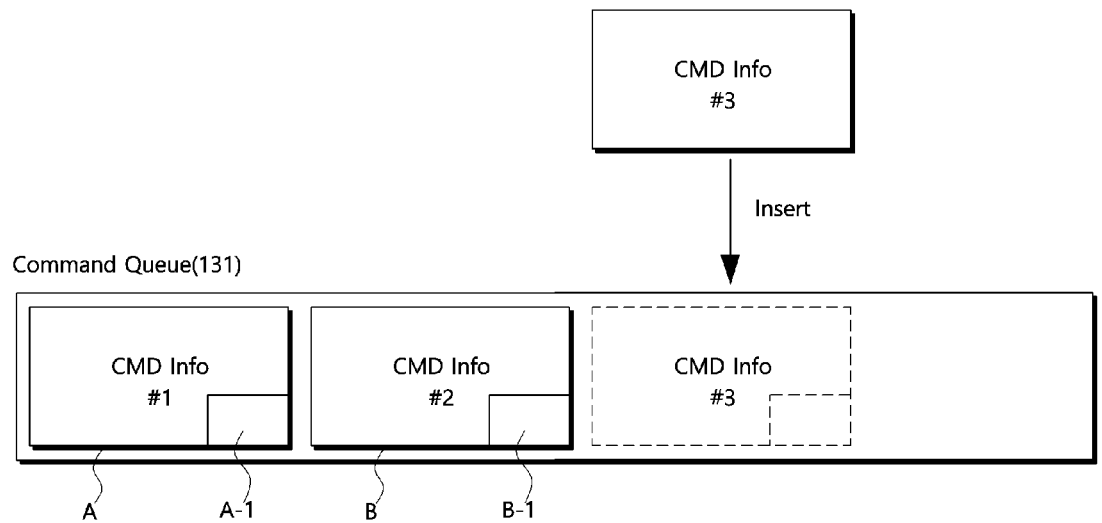

Furthermore, as illustrated in FIG. 5, the processor 110 may store summary information of a third command CMD Info #3 only in a reserved storage area B-1 allocated to the inside of a command storage area B in which the second command CMD Info #2 is stored. In FIG. 5, the commands CMD Info #1 and CMD Info #2 may be the first commands which are the previous commands of the third command CMD info #3.

When the first command includes a plurality of first commands which are distinguished from one another and the processor 110 is configured to store the summary information of the second command in a plurality of previous commands, the processor 110 may store the summary information of the second command in each of the reserved storage areas of the plurality of first commands.

In some embodiments, the processor 110 may store the summary information of the second command in a preset number of reserved storage areas among the reserved storage areas of the plurality of first commands.

In the illustrated example of FIG. 5, the processor 110 may store the summary information of the third command CMD Info #3 in the reserved storage areas A-1 and B-1 allocated to the insides of the command storage areas A and B in which the first and second commands CMD Info #1 and CMD Info #2 are stored.

Figure 6:
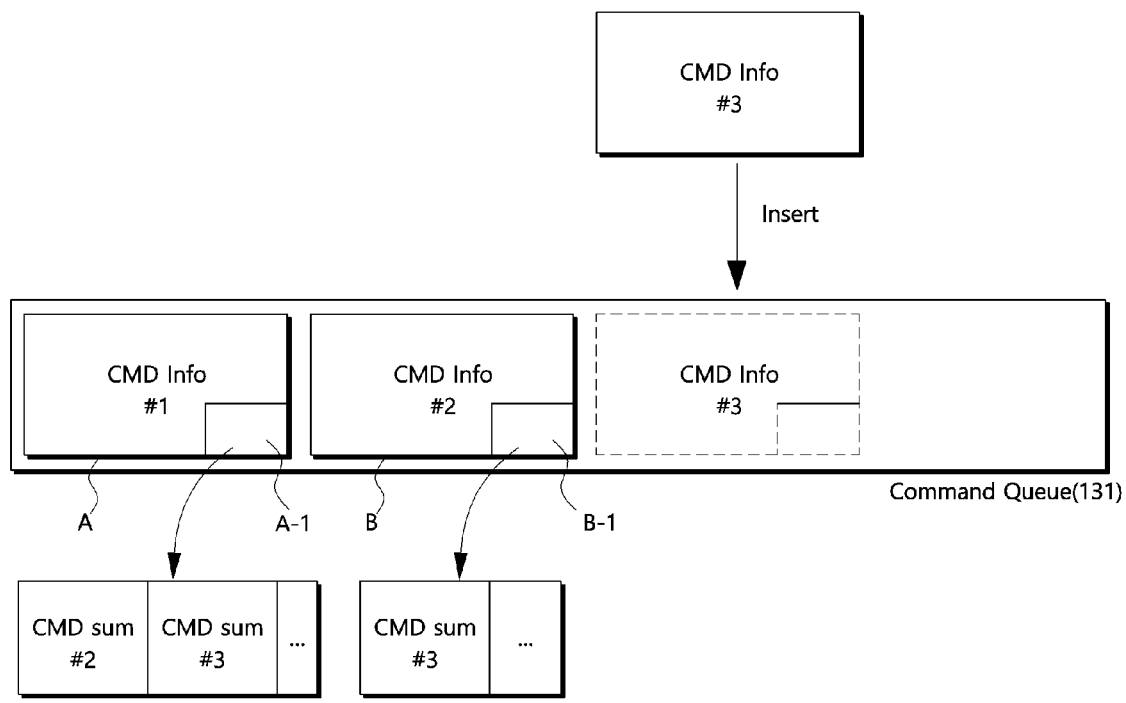

Referring to FIG. 6, the summary information of a plurality of second commands as well as the summary information of one second command CMD Sum #2 may also be stored in each of the reserved storage areas. For this operation, when allocating a reserved storage area to a command storage area, the processor 110 may allocate a reserved storage area which has a size capable of storing the summary information of one or more second commands.

As illustrated in FIG. 6, CMD sum #2 and CMD sum #3 may be stored in the reserved storage area A-1 of CMD Info #1. When inserting CMD Info #3, the processor 110 may store CMD Info #3 in the reserved storage area B-1, and then store summary information of a command, generated after CMD Info #3, in the reserved storage area B-1 or A-1 according to setting information of an operator.

Referring back to FIG. 2, the host memory 130 may include a main memory of the host 100 or the data processing system 10 which communicates with the processor 110. Codes and data which will be executed and referred to by the processor 110 may be temporarily stored in the host memory 130. The processor 110 may execute the codes such as an operating system and application and process the data, using the host memory 130. The host memory 130 may be selected from Random Access Memories (RAMs) including volatile memories such as a Static RAM (SRAM), Dynamic RAM (DRAM) and Synchronous DRAM (SDRAM) and nonvolatile memories such as a Phase-change RAM (PRAM), Magnetic RAM (MRAM), Resistive RAM (RRAM) and Ferroelectric RAM (FeRAM).

The host memory 130 may include the command queue 131 which includes a plurality of command storage areas. The command queue 131 may sequentially store plural pieces of command information inserted thereto in the respective command storage areas.

Each of the command storage areas may include a reserved storage area for storing summary information of a next command.

As illustrated in FIG. 2, the command queue 131 may include a submission queue 131-1 and a completion queue 131-2. In some embodiments, the summary information of the above-described second command may be stored in the submission queue 131-1.

The device interface 150 may provide a physical connection between the host 100 and the data storage device 200.

The user interface 170 may communicate with a user under control of the processor 110. For example, the user interface 170 may include user input interfaces such as a key board, key pad, button, touch panel, touch screen, touch pad, touch ball, camera, microphone, gyroscope sensor and vibration sensor. The user interface 170 may include user output interfaces such as a Liquid Crystal Display (LCD), Organic Light Emitting Diode (OLDE) display device, Active Matrix OLED (AMOLED) display device, LED, speaker and monitor.

The additional device 190 may include a modem to enable the data processing system 10 to communicate with an external device through various wired or wireless communication protocols.

As the data storage device 200 receives a new command notification from the host 100, the data storage device 200 may fetch the first command from the command queue 131, and store the fetched first command.

In some embodiments, the first command may indicate a command to be fetched from the host 100.

The data storage device 200 may store data accessed by a host 100 such as a mobile phone, MP3 player, laptop computer, desktop computer, game machine, TV or in-vehicle infotainment system. The data storage device 200 may also be referred to as a memory system.

The data storage device 200 may be fabricated as any one of various types of storage devices, according to an interface protocol coupled to the host 100. For example, the data storage device 200 may be configured as any one of various types of storage devices which include a Solid State Drive (SSD), a Multi-Media Card (MMC) such as an eMMC, RS-MMC or micro-MMC, a Secure Digital (SD) card such as a mini-SD or micro-SD, a Universal Serial Bus (USB) storage device, a Universal Flash Storage (UFS) device, a Personal Computer Memory Card International Association (PCMCIA) card-type storage device, a Peripheral Component Interconnection (PCI) card-type storage device, a PCI Express (PCIe) card-type storage device, a Compact Flash (CF) card, a smart media card and a memory stick.

The data storage device 200 may be fabricated as any one of various types of packages. For example, the data storage device 200 may be fabricated as any one of various types of packages such as a Package-On-Package (POP), System-In-Package (SIP), System-On-Chip (SOC), Multi-Chip Package (MCP), Chip-On-Board (COB), Wafer-level Fabricated Package (WFP) and Wafer-level Stack Package (WSP).

The data storage device 200 may include a controller 210 and a nonvolatile memory device 230.

As the controller 210 receives a new command notification from the host 100, the controller 210 may fetch a first command from the command queue 131, and store the fetched first command. In some embodiments, the controller 210 may perform a pre-operation related to the second command, based on the summary information of a second command, which is included in the first command.

In some embodiments, the first command may indicate the fetched command, and the second command may indicate a command which is generated after the first command is generated, i.e., a next command which is not yet fetched by the controller 210.

Hereafter, the case in which the controller 210 performs a pre-operation based on the summary information of the second command will be taken as an example for description.

For example, when the summary information of the second command includes a read command, a start LBA and a size, the controller 210 may prefetch the corresponding data from the nonvolatile memory device 230 based on the read command, the start LBA and the size, and store the prefetched data.

For another example, when the summary information of the second command includes a read command, a start LBA and a size, the controller 210 may previously recognize Logical-to-Physical (L2P) address mapping information on the read command, based on the read command, the start LBA and the size.

For still another example, when the summary information of the second command includes a reset command Reset CMD for requesting a reboot of a device, the controller 210 may previously store system data, stored in a volatile memory 215, into the nonvolatile memory device 230.

For yet another example, when the summary information of the second command includes a command type, a start LBA and a size, the controller 210 may previously adjust the size of a buffer for data input/output, when processing a write or read command according to the command type, the start LBA and the size.

Figure 8:
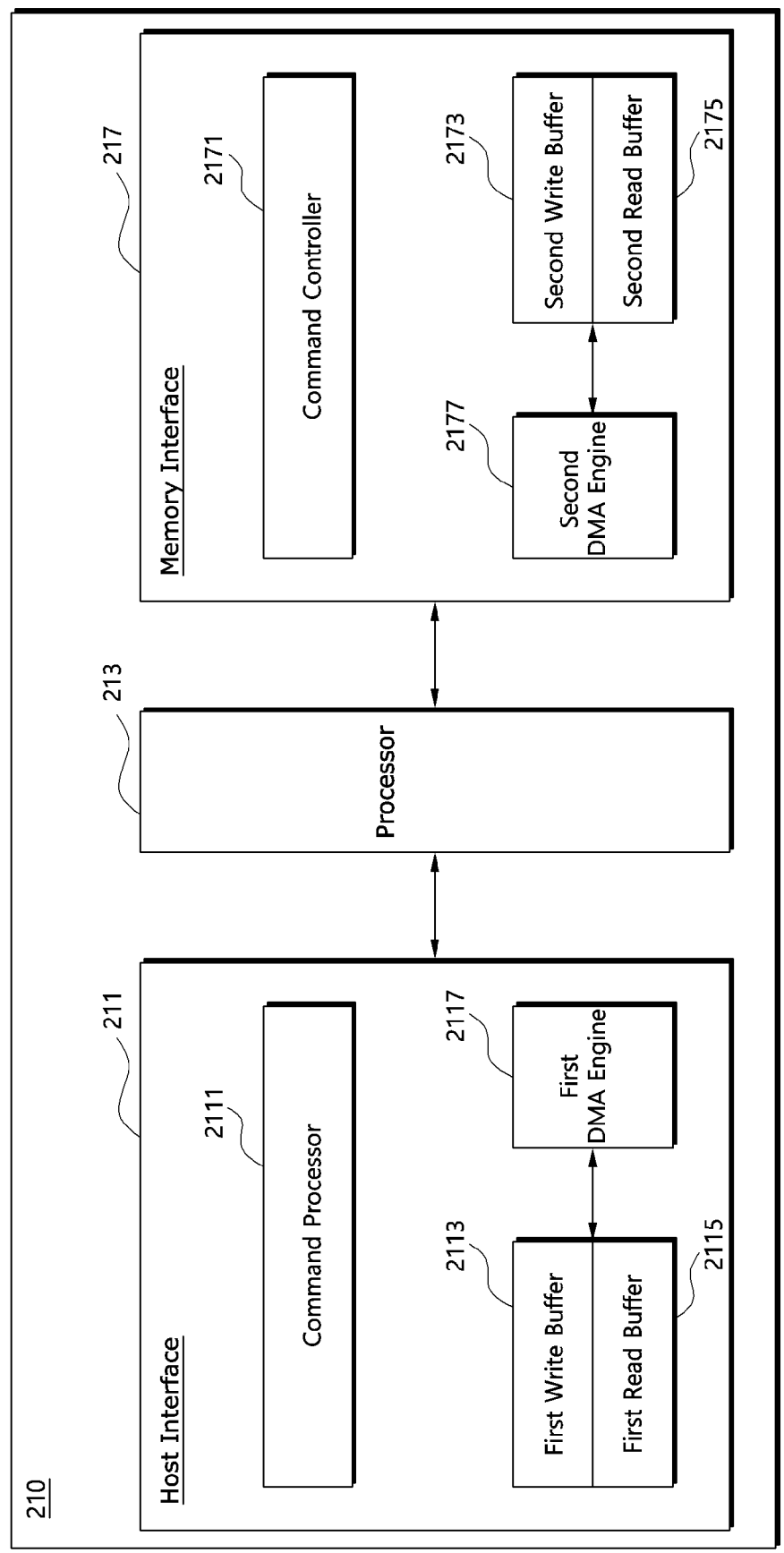
FIG. 8 is a diagram illustrating some components of a data storage device of FIG. 2 in detail.

FIG. 8 is a diagram illustrating some components of the controller 210 of the data storage device 200 in FIG. 2 in detail.

Referring to FIG. 8, the controller 210 may include a host interface 211, a processor 213 and a memory interface 217. The host interface 211 may include a command processor 2111, a first write buffer 2113, a first read buffer 2115 and a first DMA engine 2117.

The command processing unit 2111 may fetch commands provided from the host 100, schedule the processing order of the commands, and sequentially provide the commands to the processor 213.

The first write buffer 2113 may temporarily store write data provided from the host 100.

The first read buffer 2115 may temporarily store data read from the nonvolatile memory device 230.

During a write operation, the first DMA engine 2117 may transfer the data stored in the first write buffer 2113 to a buffer memory (not illustrated) provided inside or outside the controller 210, in order to store the data. During a read operation, the first DMA engine 2117 may read the data stored in the buffer memory and store the read data in the first read buffer 2115.

The memory interface 217 may provide a communication channel for transmitting and receiving signals between the controller 210 and the nonvolatile memory device 230. The memory interface 217 may write the data stored in the buffer memory to the nonvolatile memory device 230 under control of the processor 213. Furthermore, the memory interface 217 may transfer the data read from the nonvolatile memory device 230 to the buffer memory to store the data.

The memory interface 217 may include a command controller 2171, a second write buffer 2173, a second read buffer 2175 and a second DMA engine 2177.

The command controller 2171 may transmit a control signal to the nonvolatile memory device 230 based on a command provided from the processor 213.

The second write buffer 2173 may temporarily store write data transmitted from the buffer memory during a write operation.

The second read buffer 2175 may temporarily store data read from the nonvolatile memory device 230 during a read operation.

During the write operation, the second DMA engine 2177 may transfer the write data stored in the buffer memory to the second write buffer 2173 to store the write data. During the read operation, the second DMA engine 2177 may transfer the read data stored in the second read buffer 2175 to the buffer memory to store the read data.

In order to process the second command, the controller 210 may previously adjust the size of at least one of the first write buffer 2113, the first read buffer 2115, the second write buffer 2173 and the second read buffer 2175, based on the command type, the start LBA and the size which are included in the summary information of the second command.

The controller 210 may control overall operations of the data storage device 200 by driving firmware or software loaded in the memory 215. The controller 210 may decode and drive a code-based instruction or algorithm such as firmware or software. The controller 210 may be implemented in hardware or a combination of hardware and software.

Referring back to FIG. 2, the controller 210 may include the host interface 211, the processor 213, the memory 215 and the memory interface 217. Although not illustrated in FIG. 2, the controller 210 may further include an Error Correction Code (ECC) engine which generates parity data by performing ECC encoding on write data provided from the host, and performs ECC decoding on data read from the nonvolatile memory device 230 using the parity data. The ECC engine may be installed inside or outside the memory interface 217.

The host interface 211 may interface the host 100 and the data storage device 200 in response to a protocol of the host 100. For example, the host interface 211 may communicate with the host 100 through any one of protocols such as Universal Serial Bus (USB), Universal Flash Storage (UFS), Multimedia Card (MMC), Parallel Advanced Technology Attachment (PATA), Serial Advanced Technology Attachment (SATA), Small Computer System Interface (SCSI), Serial Attached SCSI (SAS), Peripheral Component Interconnection (PCI) and PCI express (PCI-e).

The processor 213 may include a Micro Control Unit (MCU) and a Central Processing Unit (CPU). The processor 213 may process a request received from the host 100. In order to process a request received from the host 100, the processor 213 may drive a code-based instruction or algorithm, i.e., firmware, which is loaded to the memory 215, and control operations on the nonvolatile memory device 230 and internal devices such as the host interface 211, the memory 215 and the memory interface 217.

The processor 213 may generate control signals for controlling an operation of the nonvolatile memory device 230, based on requests received from the host 100. Further, the processor 213 may provide the generated control signals to the nonvolatile memory device 230 through the memory interface 217.

The memory 215 may include a dynamic RAM (DRAM) or static RAM (SRAM). The memory 215 may store the firmware driven by the processor 213. Furthermore, the memory 215 may store data required for driving the firmware, for example, metadata. That is, the memory 215 may operate as a working memory of the processor 213. Although not illustrated in FIG. 2, the controller 210 may further include a processor-dedicated memory disposed adjacent to the processor 213, and the firmware and meta data stored in the memory 215 may be loaded to the processor-dedicated memory.

The memory 215 may include a data buffer for temporally storing write data which will be received from the host 100 to the nonvolatile memory device 230 or read data which are read from the nonvolatile memory device 230 and will be transmitted to the host 100. That is, the memory 215 may operate as a buffer memory.

Although FIG. 2 illustrates that the memory 215 is installed in the controller 210, the memory 215 may be installed outside the controller 210.

The memory interface 217 may control the nonvolatile memory device 230 under control of the processor 213. When the nonvolatile memory device 230 is configured as a NAND flash memory, the memory interface 217 may be referred to as a Flash Control Top (FCT). The memory interface 217 may transmit control signals, generated by the processor 213, to the nonvolatile memory device 230. The control signals may include a command, an address and an operation control signal for controlling an operation of the nonvolatile memory device 230. The operation control signal may include, for example, a chip enable signal, a command latch enable signal, an address latch enable signal, a write enable signal, a read enable signal, a data strobe signal and the like, but is not particularly limited thereto. The memory interface 217 may transmit write data to the nonvolatile memory device 230, or receive read data from the nonvolatile memory device 230.

The memory interface 217 and the nonvolatile memory device 230 may be coupled through a plurality of channels CH1 to CHn. The memory interface 217 may transmit signals, such as a command, an address, an operation control signal and data (i.e., write data), to the nonvolatile memory device 230 through the plurality of channels CH1 to CHn. The memory interface 217 may receive a status signal (for example, ready/busy) and data (i.e., read data) from the nonvolatile memory device 230 through the plurality of channels CH1 to CHn.

The nonvolatile memory device 230 may operate as a storage medium of the data storage device 200. The nonvolatile memory device 230 may be configured as any one of various types of nonvolatile memory devices such as a NAND flash memory, NOR flash memory, Ferroelectric Random Access Memory (FRAM) using a ferroelectric capacitor, Magnetic Random Access Memory (MRAM) using a Tunneling Magneto-Resistive (TMR) layer, Phase Change Random Access Memory (PRAM) using chalcogenide alloys, and Resistive Random Access Memory (ReRAM) using transition metal oxide, depending on memory cells.

The nonvolatile memory device 230 may include a memory cell array (not illustrated) having a plurality of memory cells arranged at the respective intersections between a plurality of bit lines (not illustrated) and a plurality of word lines (not illustrated). For example, each of the memory cells of the memory cell array may be a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array may include one or more of the SLC, the MLC, the TLC and the QLC. For example, the memory cell array may include memory cells with a two-dimensional horizontal structure or memory cells with a three-dimensional vertical structure.

Figure 9:
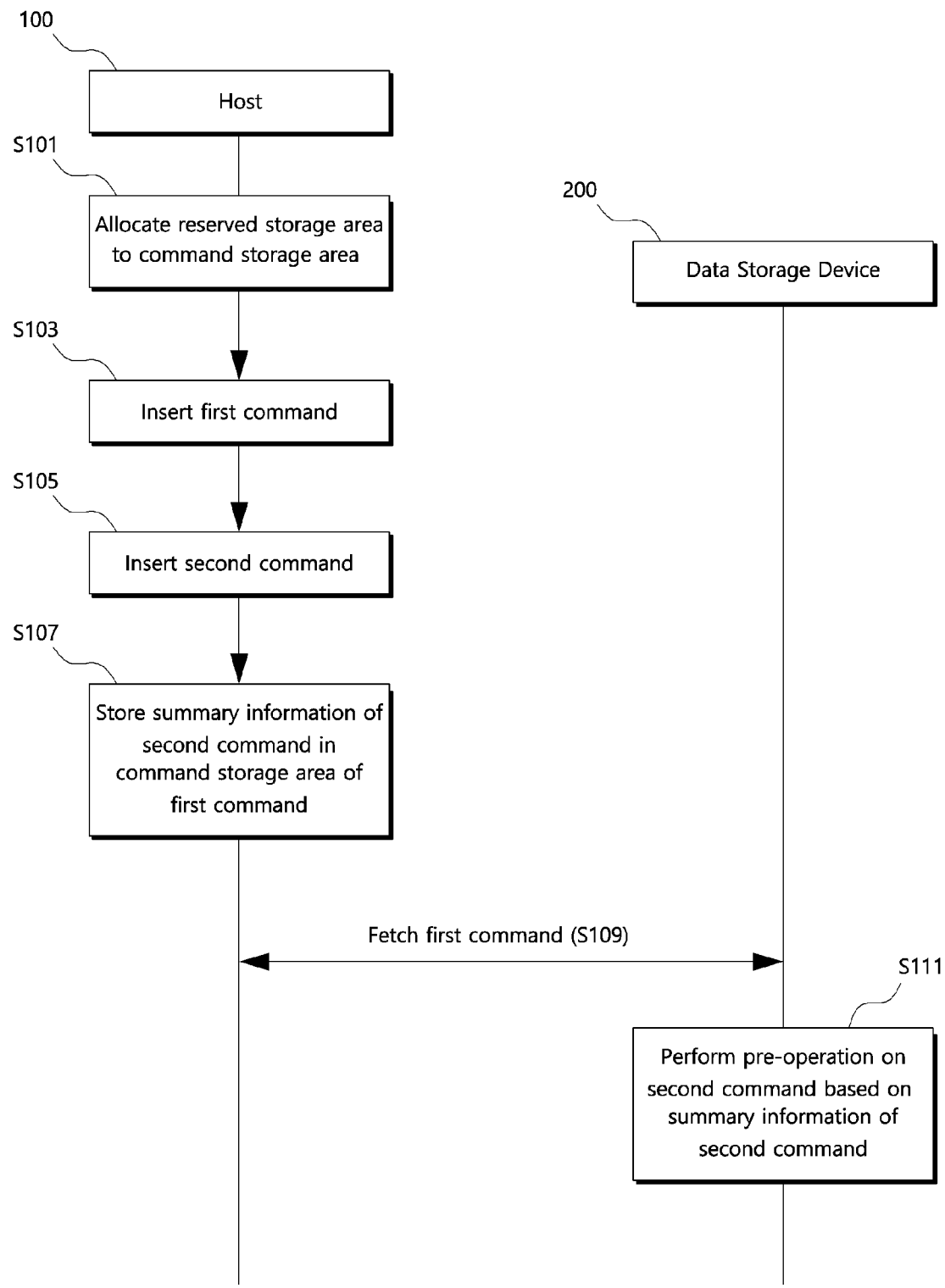
FIG. 9 is a flowchart for describing a data processing method in accordance with an embodiment of the present disclosure.

FIG. 9 is a flowchart for describing a data processing method in accordance with an embodiment of the present disclosure.

Referring to FIG. 9, in operation S101, the host 100 may allocate a reserved storage area to each of a plurality of command storage areas in the command queue 131.

In operation S103, the host 100 may insert a first command into a first command storage area of the command queue 131.

In operation S105, the host 100 may insert a second command into a second command storage area of the command queue 131. Then, in operation S107, the host 100 may store summary information of the second command in the reserved storage area of the first command which is the previous command of the second command, and generate a new command notification.

In some embodiments, the host 100 may insert the second command into the command queue 131 after or before storing the summary information of the second command in the reserved storage area of the first command. That is, the order of operation S105 may be changed according to an operator's necessity.

Although not illustrated, the operation S107 may include checking whether the first command has been fetched, when inserting the second command, and storing the summary information of the second command in the reserved storage area of the command storage area in which the first command is stored, when the check result indicates that the first command is not yet fetched.

For another example, when inserting the second command, the host 100 may store the summary information of the second command in the reserved storage area of the command storage area in which the first command is stored, without checking whether the first command has been fetched, in operation S107.

As described above, when storing the summary information of the second command in the reserved storage area, the host 100 may check whether the first command has been fetched, and store the summary information of the second command according to the check result, or store the summary information of the second command regardless of whether the first command has been fetched.

As the data storage device 200 receives a new command notification received from the host 100, the data storage device 200 may fetch the first command in operation S109. Further, the data storage device 200 may perform an operation on the nonvolatile memory device associated with the first command.

In operation S111, the data storage device 200 may perform a pre-operation related to the second command based on the summary information of the second command, transferred with the first command.

Figure 10:
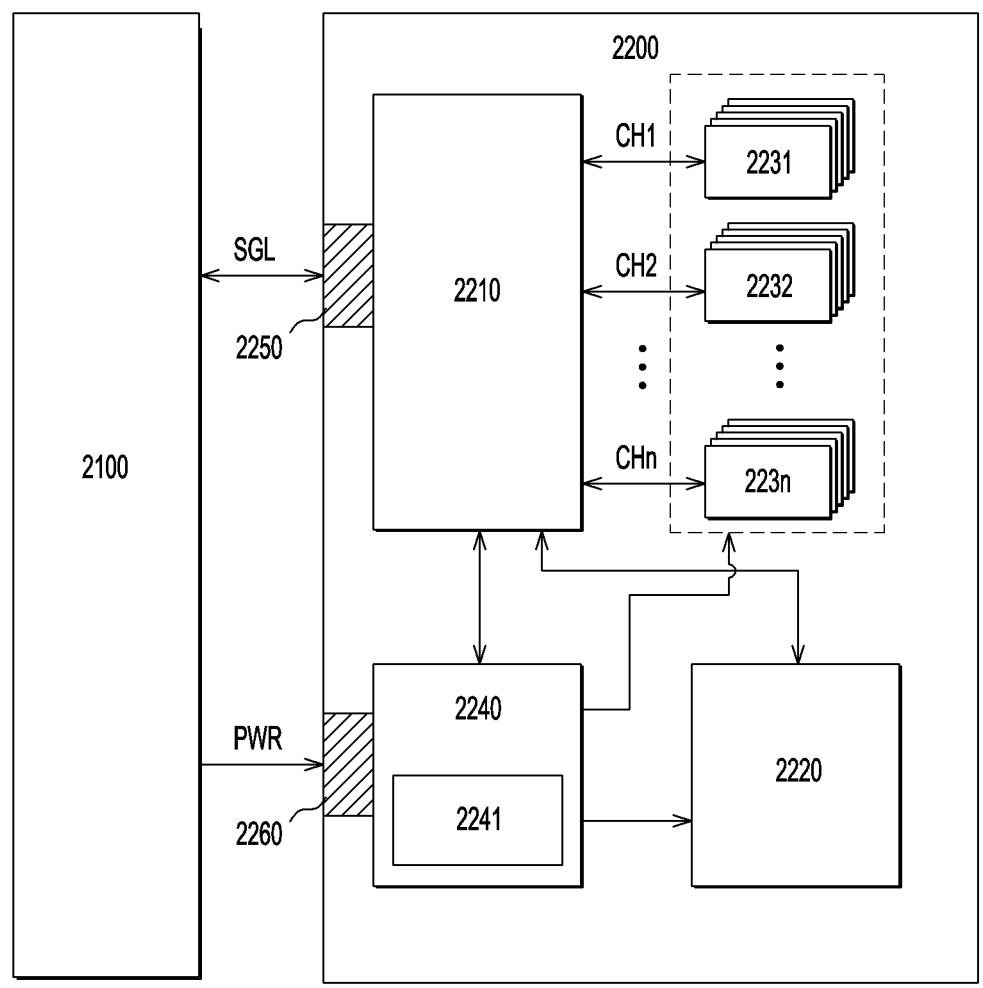
FIG. 10 is a diagram illustrating a data processing system including a Solid State Drive (SSD) in accordance with an embodiment of the present disclosure.

FIG. 10 is a diagram illustrating a data processing system 2000 including a Solid State Drive (SSD) in accordance with an embodiment of the present disclosure. Referring to FIG. 10, the data processing system 2000 may include a host 2100 and an SSD 2200.

The SSD 2200 may include a controller 2210, a buffer memory device 2220, nonvolatile memory devices 2231 to 223n, a power supply 2240, a signal connector 2250 and a power connector 2260.

The controller 2210 may control overall operations of the SSD 2200.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host 2100 or the nonvolatile memory devices 2231 to 223n under control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn, respectively. One channel may be coupled to one or more nonvolatile memory devices. The nonvolatile memory devices coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally shut down the SSD 2200, when a sudden power off occurs. The auxiliary power supply 2241 may include large capacitors capable of storing the power PWR.

The controller 2210 may exchange signals SGL with the host 2100 through the signal connector 2250. The signals SGL may include a command, an address, data and the like. The signal connector 2250 may be configured as various types of connectors depending on an interface method between the host 2100 and the SSD 2200.

Figure 11:
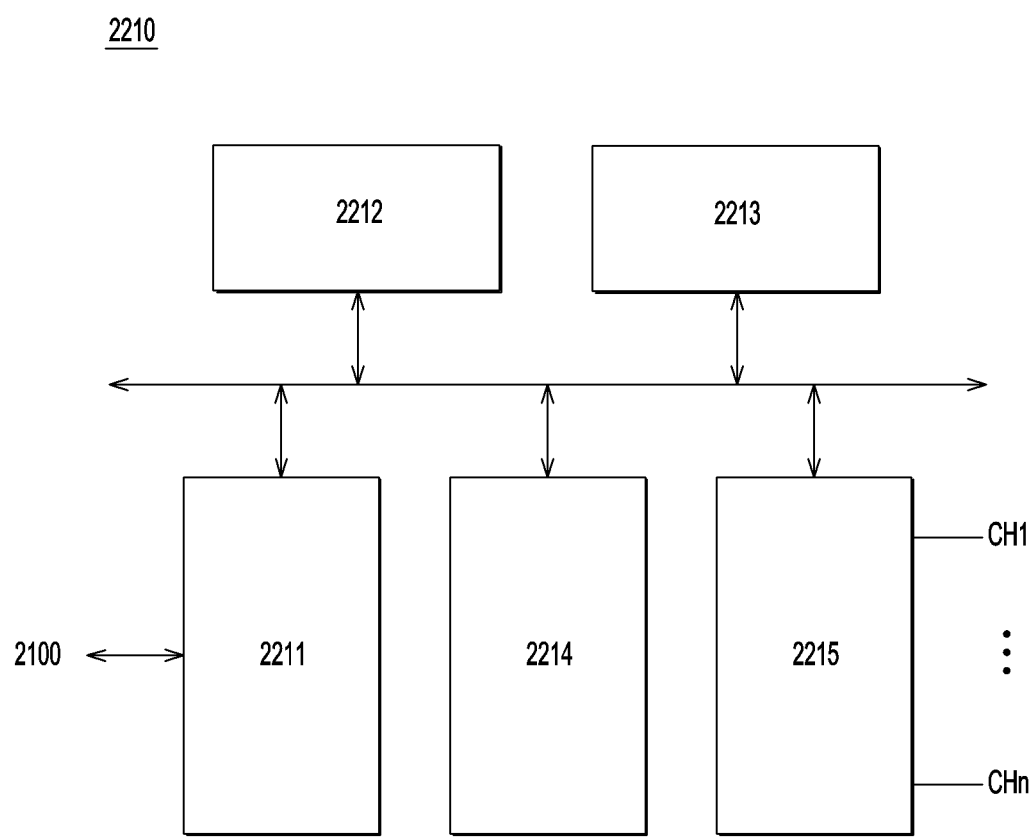
FIG. 11 is a diagram illustrating a configuration of a controller of FIG. 10.

FIG. 11 is a diagram illustrating a configuration of the controller 2210 of FIG. 10. Referring to FIG. 11, the controller 2210 may include a host interface 2211, a control component 2212, a RAM 2213, an ECC component 2214 and a memory interface 2215.

The host interface 2211 may interface the host 2100 and the SSD 2200 according to a protocol of the host 2100. For example, the host interface 2211 may communicate with the host 2100 through one or more of standard transfer protocols such as Secure Digital (SD), Universal Serial Bus (USB), Multi-Media Card (MMC), Embedded MMC (eMMC), Personal Computer Memory Card International Association (PCMCIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI Express (PCI-e) and Universal Flash Storage (UFS ( ) The host interface 2211 may perform a disk emulation function for supporting the host 2100 to recognize the SSD 2200 as a general-purpose data storage device, for example, a Hard Disk Drive (HDD).

The control component 2212 may analyze and process a signal SGL inputted from the host 2100. The control component 2212 may control operations of the internal function blocks according to firmware or software for driving the SSD 2200. The RAM 2213 may be used as a working memory for driving such firmware or software.

The ECC component 2214 may generate parity data of data to be transmitted to the nonvolatile memory devices 2231 to 223n. The generated parity data may be stored in the nonvolatile memory devices 2231 to 223n with the data. The ECC component 2214 may detect an error of data read from the nonvolatile memory devices 2231 to 223n, based on the parity data. When the detected error falls within a correctable range, the ECC component 2214 may correct the detected error.

The memory interface 2215 may provide a control signal such as a command and address to the nonvolatile memory devices 2231 to 223n, under control of the control component 2212. The memory interface 2215 may exchange data with the nonvolatile memory devices 2231 to 223n, under control of the control component 2212. For example, the memory interface 2215 may provide data stored in the buffer memory device 2220 to the nonvolatile memory devices 2231 to 223n, or provide data read from the nonvolatile memory devices 2231 to 223n to the buffer memory device 2220.

Figure 12:
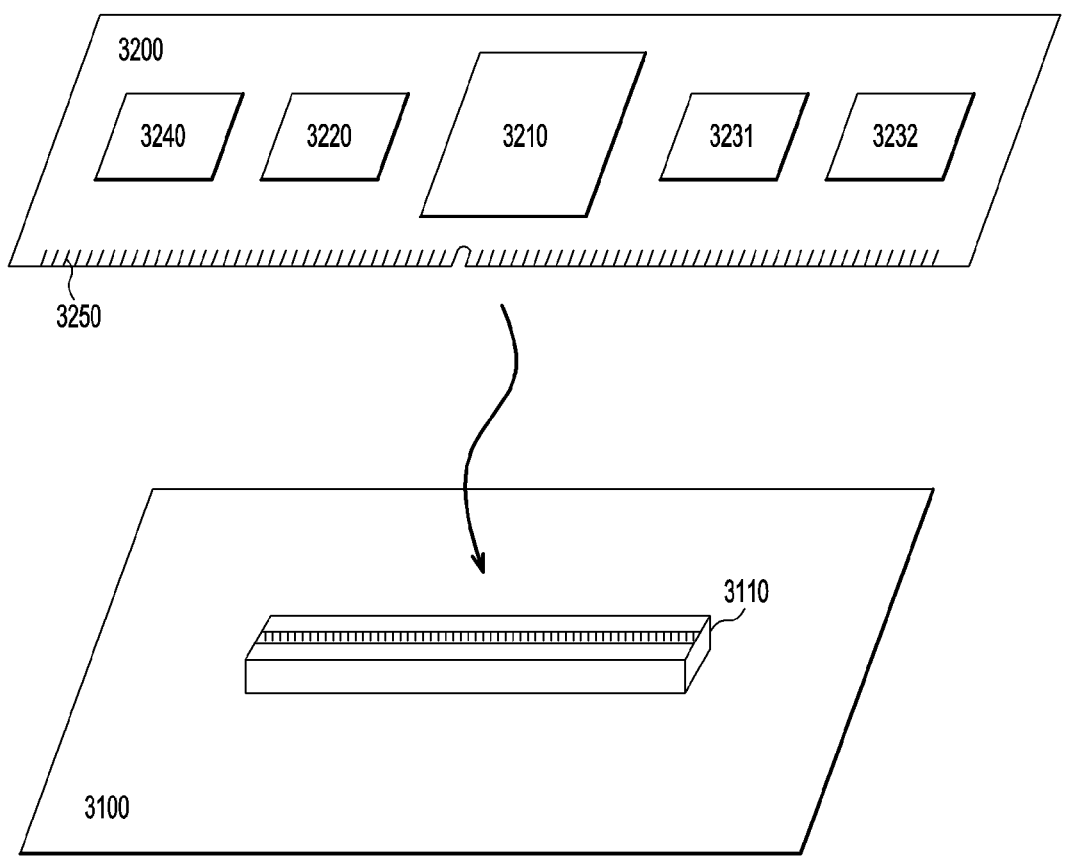
FIG. 12 is a diagram illustrating a data processing system including a data storage device in accordance with an embodiment of the present disclosure.

FIG. 12 is a diagram illustrating a data processing system 3000 including a data storage device in accordance with an embodiment of the present disclosure. Referring to FIG. 12, the data processing system 3000 may include a host 3100 and a data storage device 3200.

The host 3100 may be configured in the form of a board such as a printed circuit board. Although not illustrated, the host 3100 may include internal function blocks for performing the function of the host.

The host 3100 may include a connection terminal 3110 such as a socket, slot or connector. The data storage device 3200 may be mounted on the connection terminal 3110.

The data storage device 3200 may be configured in the form of a board such as a printed circuit board. The data storage device 3200 may be referred to as a memory module or memory card. The data storage device 3200 may include a controller 3210, a buffer memory device 3220, nonvolatile memory devices 3231 and 3232, a Power Management Integrated Circuit (PMIC) 3240 and a connection terminal 3250.

The controller 3210 may control overall operations of the data storage device 3200. The controller 3210 may be configured in the same manner as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host 3100 or the nonvolatile memory devices 3231 and 3232 under control of the controller 3210.

The nonvolatile memory devices 3231 and 3232 may be used as storage media of the data storage device 3200.

The PMIC 3240 may provide power inputted through the connection terminal 3250 into the data storage device 3200. The PMIC 3240 may manage power of the data storage device 3200 under control of the controller 3210.

The connection terminal 3250 may be connected to the connection terminal 3110 of the host 3100. Through the connection terminal 3250, power and signals such as commands, addresses and data may be transferred between the host 3100 and the data storage device 3200. The connection terminal 3250 may be configured in various manners depending on an interface method between the host 3100 and the data storage device 3200. The connection terminal 3250 may be disposed on any one side of the data storage device 3200.

Figure 13:
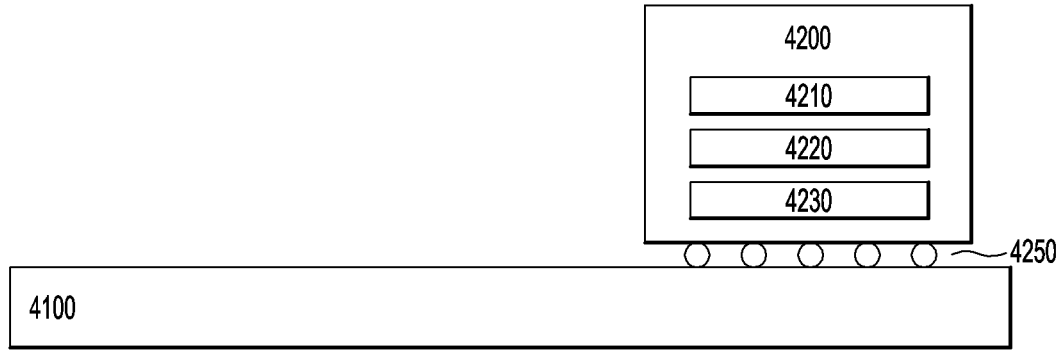
FIG. 13 is a diagram illustrating a data processing system including a data storage device in accordance with an embodiment of the present disclosure.

FIG. 13 is a diagram illustrating a data processing system 4000 including a data storage device in accordance with an embodiment of the present disclosure. Referring to FIG. 13, the data processing system 4000 may include a host 4100 and a data storage device 4200.

The host 4100 may be configured in the form of a board such as a printed circuit board. Although not illustrated, the host 4100 may include internal function blocks for performing the function of the host.

The data storage device 4200 may be configured in the form of a surface mount package. The data storage device 4200 may be mounted on the host 4100 through solder balls 4250. The data storage device 4200 may include a controller 4210, a buffer memory device 4220 and a nonvolatile memory device 4230.

The controller 4210 may control overall operations of the data storage device 4200. The controller 4210 may be configured in the same manner as the controller 2210 illustrated in FIG. 11.

The buffer memory device 4220 may temporarily store data to be stored in the nonvolatile memory device 4230. The buffer memory device 4220 may temporarily store data read from the nonvolatile memory devices 4230. The data temporarily stored in the buffer memory device 4220 may be transmitted to the host 4100 or the nonvolatile memory device 4230 under control of the controller 4210.

The nonvolatile memory device 4230 may be used as a storage medium of the data storage device 4200.

Figure 14:
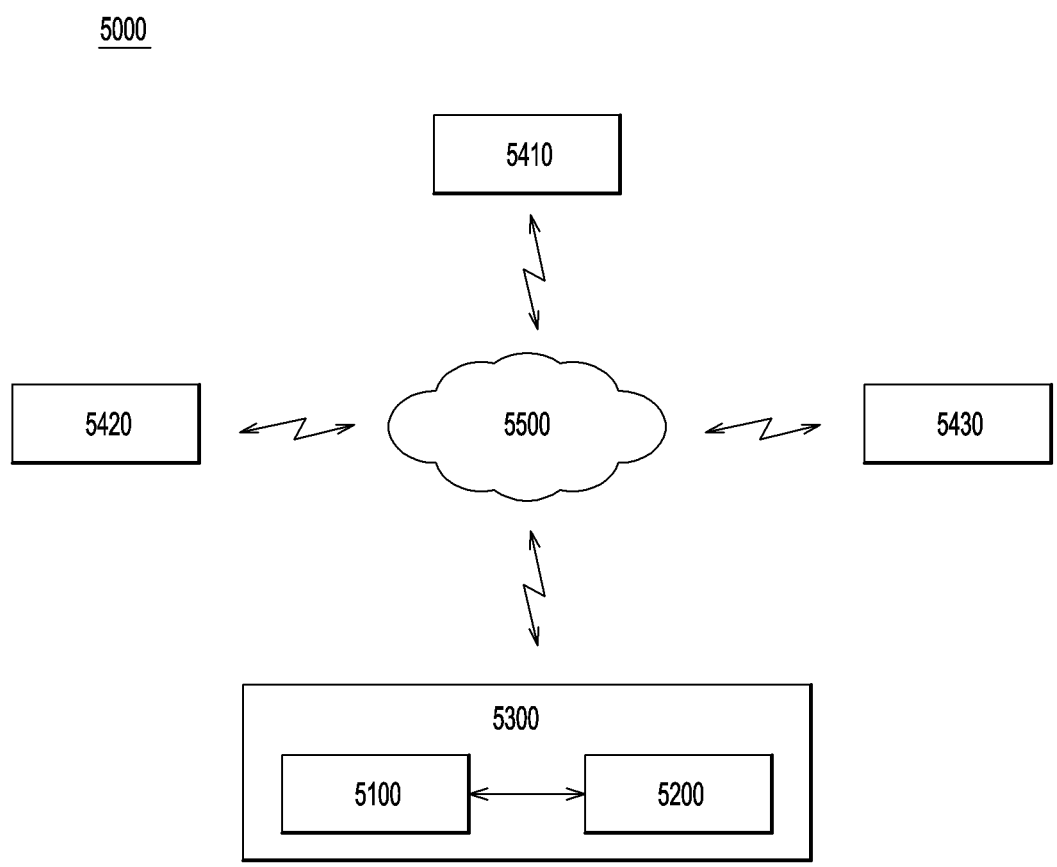
FIG. 14 is a diagram illustrating a network system including a data storage device in accordance with an embodiment of the present disclosure.

FIG. 14 is a diagram illustrating a network system 5000 including a data storage device in accordance with an embodiment of the present disclosure. Referring to FIG. 14, the network system 500 may include a server system 5300 and a plurality of client systems 5410 to 5430, which are connected through a network 5500.

The server system 5300 may service data in response to requests from the plurality of client systems 5410 to 5430. For example, the server system 5300 may store data provided from the plurality of client systems 5410 to 5430. For another example, the server system 5300 may provide data to the plurality of client systems 5410 to 5430.

The server system 5300 may include a host 5100 and a data storage device 5200. The data storage device 5200 may be configured as the data storage device 200 of FIG. 2, the SSD 2200 of FIG. 10, the data storage device 3200 of FIG. 12 and the data storage device 4200 of FIG. 13.

Figure 15:
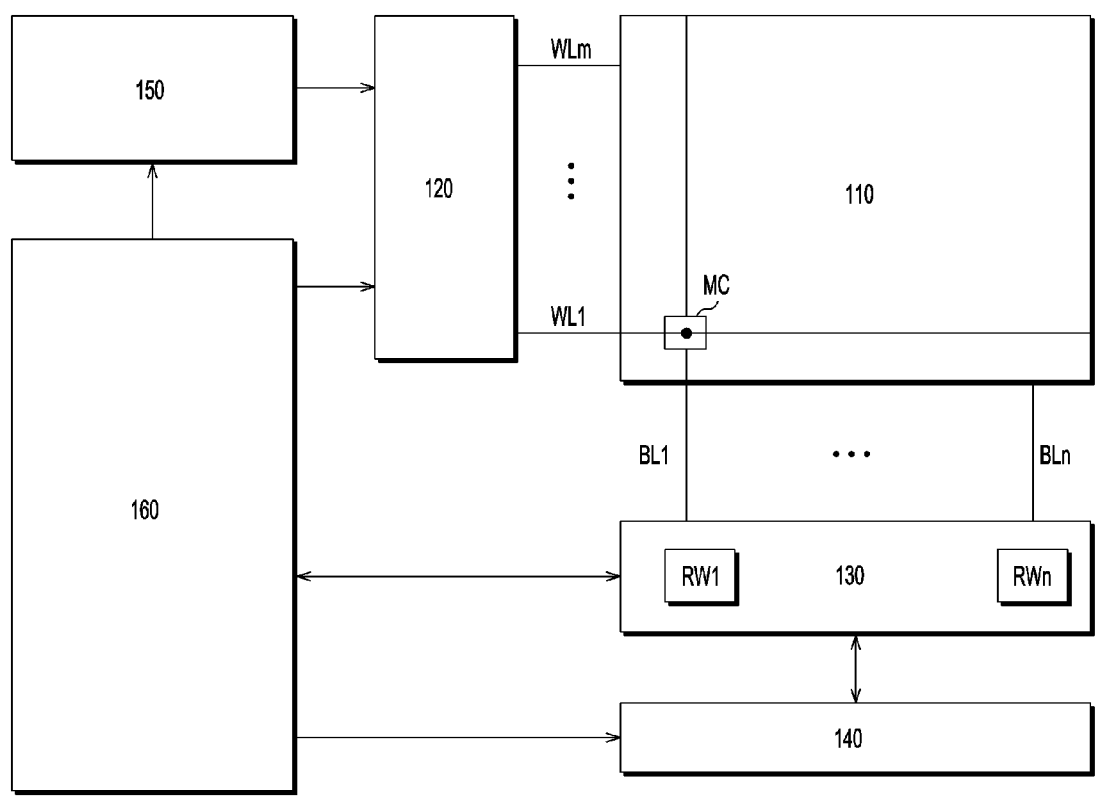
FIG. 15 is a block diagram illustrating a nonvolatile memory device included in a data storage device in accordance with an embodiment of the present disclosure.

FIG. 15 is a block diagram illustrating a nonvolatile memory device 100 in a data storage device in accordance with an embodiment of the present disclosure. Referring to FIG. 15, the nonvolatile memory device 100 may include a memory cell array 110, a row decoder 120, a column decoder 130, a data read/write block 140, a voltage generator 150 and a control logic 160.

The memory cell array 110 may include memory cells MC arranged at the respective intersections between word lines WL1 to WLm and bit lines BL1 to BLn.

The row decoder 120 may be coupled to the memory cell array 110 through the word lines WL. The row decoder 120 may operate under control of the control logic 160. The row decoder 120 may decode an address provided from an external device (not illustrated). The row decoder 120 may select and drive the word lines WL1 to WLm based on the decoding result. For example, the row decoder 120 may provide the word lines WL1 to WLm with a word line voltage provided from the voltage generator 150.

The data read/write block 140 may be coupled to the memory cell array 110 through the bit lines BL1 to BLn. The data read/write block 140 may include read/write circuits RW1 to RWn corresponding to the respective bit lines BL1 to BLn. The data read/write block 140 may operate under control of the control logic 160. The data read/write block 140 may operate as a write driver or a sense amplifier, depending on operation modes. For example, the data read/write block 140 may operate as a write driver for storing data, provided from the external device, in the memory cell array 110 during a write operation. For another example, the data read/write block 140 may operate as a sense amplifier for reading data from the memory cell array 110 during a read operation.

The column decoder 130 may operate under control of the control logic 160. The column decoder 130 may decode an address provided from the external device. The column decoder 130 may couple the read/write circuits RW1 to RWn of the data read/write block 140, corresponding to the respective bit lines BL1 to BLn, to a data input/output line (or data input/output buffer), based on the decoding result.

The voltage generator 150 may generate a voltage used for an internal operation of the nonvolatile memory device 100. The voltages generated by the voltage generator 150 may be applied to the memory cells of the memory cell array 110. For example, a program voltage generated during a program operation may be applied to a word line of memory cells on which the program operation is to be performed. For another example, an erase voltage generated during an erase operation may be applied to well regions of memory cells on which the erase operation is to be performed. For another example, a read voltage generated during a read operation may be applied to a word line of memory cells on which the read operation is to be performed.

The control logic 160 may control overall operations of the nonvolatile memory device 100 based on a control signal provided from the external device. For example, the control logic 160 may control operations of the nonvolatile memory device 100, such as read, write and erase operations of the nonvolatile memory device 100.

While various embodiments have been described above, it will be understood to those skilled in the art that the embodiments described are examples only. Accordingly, the host, the data storage device, the data processing system and the data processing method, which have been described herein, should not be limited based on the described embodiments.

While the present invention has been described with respect to the specific embodiments, it will be apparent to those skilled in the art that various changes and modifications may be made without departing from the spirit and scope of the invention as defined in the following claims.

What is claimed is:

1. A data processing system comprising:
a host including a command queue including a plurality of command storage areas, and configured to insert a first command into the command queue and, when inserting a second command being a next command of the first command, store summary information of the second command in a reserved storage area of a command storage area, among the plurality of command storage areas, in which the first command is stored; and
a data storage device configured to fetch the first command and the summary information of the second command from the command queue and store the fetched first command and the fetched summary information of the second command, according to a new command notification received from the host.

2. The data processing system according to claim 1, wherein the host comprises:
a host memory comprising the command queue including the plurality of command storage areas, and configured to sequentially store plural pieces of command information, inserted thereto, in the plurality of command storage areas, respectively; and
a processor configured to store the summary information of the second command in the reserved storage area allocated to the inside of the command storage area of the first command, when inserting the second command into the command queue.

3. The data processing system according to claim 2, wherein the processor checks whether the first command has been fetched, when inserting the second command into the command queue, and stores the summary information of the second command in the reserved storage area of the command storage area in which the first command is stored, when the first command is not yet fetched.

4. The data processing system according to claim 2, wherein when inserting the second command into the command queue, the processor stores the summary information of the second command in the reserved storage area of the command storage area in which the first command is stored, without checking whether the first command has been fetched.

5. The data processing system according to claim 2, wherein when the host is configured to store summary information of one command just before the second command,
the processor stores the summary information of the second command in the reserved storage area of one first command just before the second command.

6. The data processing system according to claim 2, wherein the plurality of commands includes a plurality of first commands which are distinguished from one another,
wherein when the host is configured to store the summary information of the second command in a plurality of previous commands in the case that the summary information is stored, the processor stores the summary information of the second command in each of the reserved storage areas of the plurality of first commands.

7. The data processing system according to claim 6, wherein the processor stores the summary information of the second command in a set number of reserved storage areas among the reserved storage areas of the plurality of first commands.

8. The data processing system according to claim 2, wherein when allocating a reserved storage area to the command storage area, the processor allocates a reserved storage area having a size capable of storing summary information of one or more second commands.

9. The data processing system according to claim 1, wherein the summary information of the second command comprises a command type, a start logical block address (LBA) and a size of a command.

10. The data processing system according to claim 1, wherein the data storage device comprises:
a nonvolatile memory device; and
a controller configured to control the nonvolatile memory device to fetch the first command associated with the nonvolatile memory device from the command queue and store the fetched first command, according to a new command notification received from the host, and perform a pre-operation related to the second command associated with the nonvolatile memory device based on the summary information of the second command, included in the first command.

11. The data processing system according to claim 10, wherein when the summary information of the second command comprises a read command, a start LBA and a size,
the controller prefetches data, corresponding to the read command, the start LBA and the size, from the nonvolatile memory device and stores the prefetched data, based on the read command, the start LBA and the size.

12. The data processing system according to claim 10, wherein when the summary information of the second command comprises a read command, a start LBA and a size,
the controller previously recognizes Logical-to-Physical (L2P) address mapping information on the read command based on the read command, the start LBA and the size.

13. The data processing system according to claim 10, wherein when the summary information of the second command comprises a command type, a start LBA and a size, the controller previously adjusts the size of a buffer for data input/output when processing a write command or read command according to the command type, the start LBA and the size.

14. A host comprising:
a host memory comprising a command queue including a plurality of command storage areas, and configured to sequentially store plural pieces of command information, inserted thereto, in the plurality of command storage areas, respectively; and
a processor configured to insert a first command into the command queue and, when inserting a second command being a next command of the first command, store summary information of the second command in the command storage area of the first command,
wherein each of the command storage areas comprises a reserved storage area for storing summary information of a next command, and the summary information of the second command is stored in the reserved storage area.

15. The host according to claim 14, wherein the processor checks whether the first command has been fetched, when inserting the second command, and stores the summary information of the second command in the reserved storage area of the command storage area in which the first command is stored, when the first command is not yet fetched.

16. The host according to claim 14, wherein when inserting the second command, the processor stores the summary information of the second command in the reserved storage area of the command storage area in which the first command is stored, without checking whether the first command has been fetched.

17. The host according to claim 14, wherein when the processor is configured to store summary information of one command just before the second command, the processor stores the summary information of the second command in the reserved storage area of one first command just before the second command.

18. The host according to claim 14, wherein the plurality of commands includes a plurality of first commands which are distinguished from one another,
wherein when the processor is configured to store the summary information of the second command in a plurality of previous commands in the case that the summary information is stored, the processor stores the summary information of the second command in each of the reserved storage areas of the plurality of first commands.

19. The host according to claim 14, wherein when allocating a reserved storage area to the command storage area, the processor allocates a reserved storage area having a size capable of storing summary information of one or more second commands.

20. A data storage device comprising:
a nonvolatile memory device; and
a controller configured to control the nonvolatile memory device to fetch a first command and summary information of a second command, included in the first command, associated with the nonvolatile memory device from a command queue of a host and store the fetched first command and the fetched summary information of the second command, according to a new command notification received from the host, and perform a pre-operation related to the second command based on the summary information of the second command,
wherein the second command is a next command of the first command.

* * * * *